United States Patent [19]

Siegel

[11] 3,961,675
[45] June 8, 1976

[54] PORTABLE HOUSING FOR WEIGHING SYSTEMS

[76] Inventor: Vernon Harold Siegel, 5120 Brookfield Lane, Clarence, N.Y. 14031

[22] Filed: May 1, 1975

[21] Appl. No.: 573,455

[52] U.S. Cl. .............................. 177/126; 177/145
[51] Int. Cl.² ................. G01G 21/00; G01G 19/00
[58] Field of Search .......... 177/126, 127, 145, 209, 177/245

[56] References Cited
UNITED STATES PATENTS
3,530,949  9/1970  Swersey et al. ................ 177/209

*Primary Examiner*—George H. Miller, Jr.
*Attorney, Agent, or Firm*—William H. McNeill

[57] ABSTRACT

A portable housing for a weighing system for monitoring the weight of a non-ambulatory patient comprises an elongated box-like apparatus having a central section and two end sections. Each of the two end sections carries an operatively positioned weight responsive element and is formed to provide a receptacle for the leg of the bed and an entrance for the leg of the bed. Also included with each end are means for releasibly retaining the leg of the bed therein.

The device is particularly useful with wheeled beds and the receptacles formed in the ends allow easy excess for said wheels. Further, the device is adjustable to accommodate beds of different widths.

6 Claims, 11 Drawing Figures

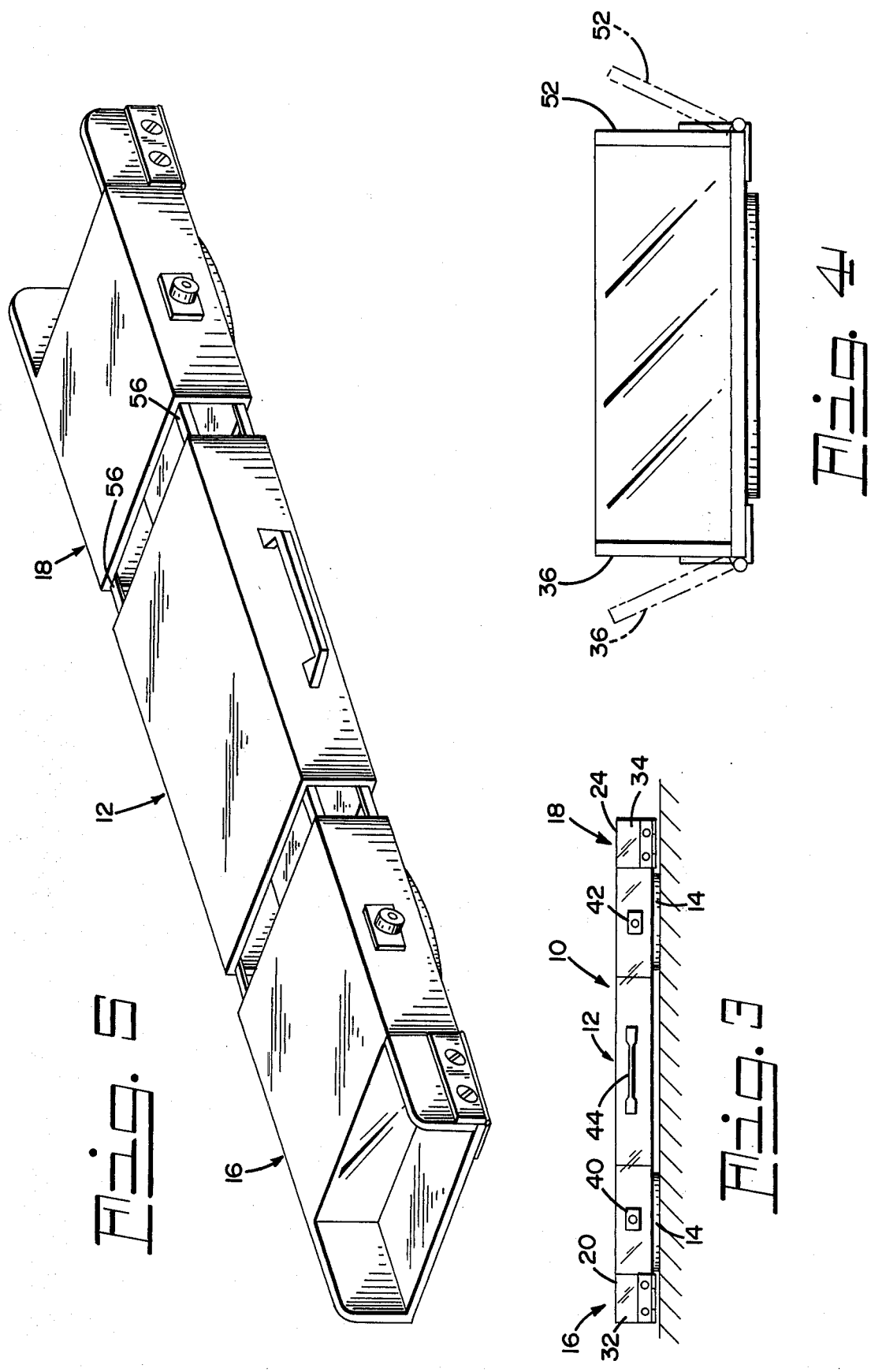

3,961,675

PORTABLE HOUSING FOR WEIGHING SYSTEMS

BACKGROUND OF THE INVENTION

This invention relates to weighing systems and more particularly to a portable housing for a weighing system for use in monitoring the weight of non-ambulatory hospital patients.

In certain cases of illness it is diagnostically important to be able to constantly observe the weight of a non-ambulatory patient. Numerous systems have been proposed to accomplish this result. In one instance, specialized beds are mounted upon fixed weighing devices which are connected to appropriate readout apparatus.

Another proposed device has employed four separate and distinct transducers which are individually mounted under the legs of the bed and which are also connected to an appropriate readout source. While each of these devices perform the required function there are certain inherent disadvantages adhering to either approach. In the apparatus whereat the bed is mounted upon a fixed weighing system, it is necessary to transport the patient to this special bed in order for the patient weight to be constantly monitored. This provides extreme discomfort for the patient and limits the area in which the weighing system can be used.

In the case of the system employing the individual weight detecting elements, the above disadvantage is avoided; however, this system is bulky and difficult to transport. Furthermore, it becomes quite laborious to place the bed upon the individual weighing elements. This is apparent from the fact that modern hospital beds that are fully adjustable currently weigh in the neighborhood of 475 pounds. Often these beds are fitted with a water-filled mattress which will weigh in the neighborhood of 250 to 300 pounds. When the weight of the patient, which can be between 100 and 300 pounds, is added thereto, it can be seen that a total weight of 1000 pounds is approached. Therefore, the requirement that the bed be lifted so that the individual transducers can be placed under the legs of the bed becomes a burdensome problem.

OBJECTS AND SUMMARY OF THE INVENTION

It is therefore an object of this invention to obviate the disadvantages of the prior art.

It is a further object of this invention to provide a housing for a weighing system that is easily transportable and easily fitted to any standard hospital bed.

It is a further object of the invention to provide such a system that contains access ports for the bed whereby the bed can be rolled into a suitable operative position.

These objects are accomplished in one aspect of the invention by the provision of a portable housing for a weighing system for monitoring the weight of a non-ambulatory patient, which housing comprises an elongated box-like apparatus having a central section and two end sections. Each of the end sections of the housing carries an operatively positioned weight responsive element and is formed to provide a receptacle for the terminal portion of the leg of a bed. Associated with this receptacle is an entrance for the terminal portion and means for releasibly restraining the terminal portion therein.

BRIEF DESCRIPTION OF THE DRAWINGS

FIG. 3 is an elevational view of one form of housing for the invention;

FIG. 4 is an end view of an alternate embodiment of the invention;

FIG. 5 is a perspective view of yet another alternate embodiment of the invention;

DESCRIPTION OF THE PREFERRED EMBODIMENT

For a better understanding of the present invention, together with other and further objects, advantages, and capabilities thereof, reference is made to the following disclosure and appended claims taken in conjunction with the above-described drawings.

Figure 1:
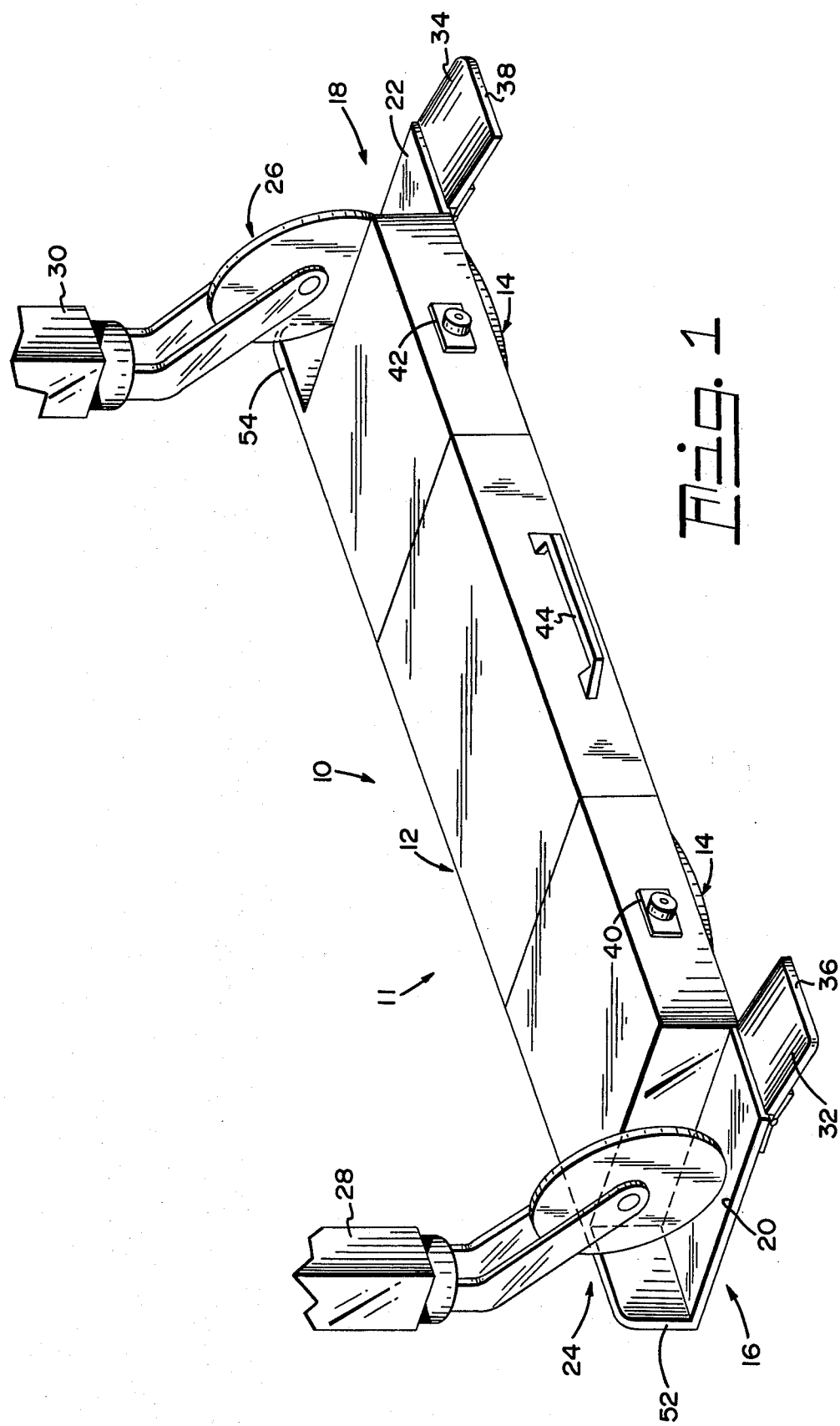
FIG. 1 is a perspective view of a housing in accordance with the invention.

Referring now to the invention with greater particularity there is shown in FIG. 1 a portable housing 10 for a weighing system for monitoring the weight of a non-ambulatory patient. The housing 10 comprises an elongated box-like apparatus 11 having a central section 12 and two end sections 16 and 18 each of which contains at least one operably positioned weight responsive element 14. In the particular embodiment shown elements 14 each extend at least partially from the bottom surface of the end sections 16 and 18. These end sections are further formed to provide receptacles 20, 22 respectively for receiving the terminal portions 24, 26 of the legs 28, 30 of the bed. Since each housing receives two legs of a bed it will be apparent that two of the portable housings will be necessary for the complete weighing system; that is, one housing unit will receive the front legs of the bed and one housing unit will receive the back legs of the bed. Means are provided associated with both of the end sections 16 and 18 for providing an entrance for the terminal portions of the legs and for releasibly restraining the terminal portions of the bed legs therein. In the embodiments shown in FIG. 1 entrance portions 32 and 34 are provided by hinging the front walls 36, 38 of the receptacles 20 and 22. When the walls 36 and 38 are lowered, the bed, if it has wheeled legs, may be easily rolled into proper position into the receptacles 20 and 22. After the bed is positioned, the walls 36 and 38 are repositioned in their upright orientation, thus forming a box-like structure which maintains the legs of the bed in the receptacles 20 and 22. Weight responsive element connecting means 40 and 42 are provided on front walls of the end sections 16 and 18 of housing 10 so that appropriate connection can be made to a suitable readout device. A centrally located handle 44 is also provided on the front wall of the central section so that the unit may easily be transported to any desired location.

Figure 2:
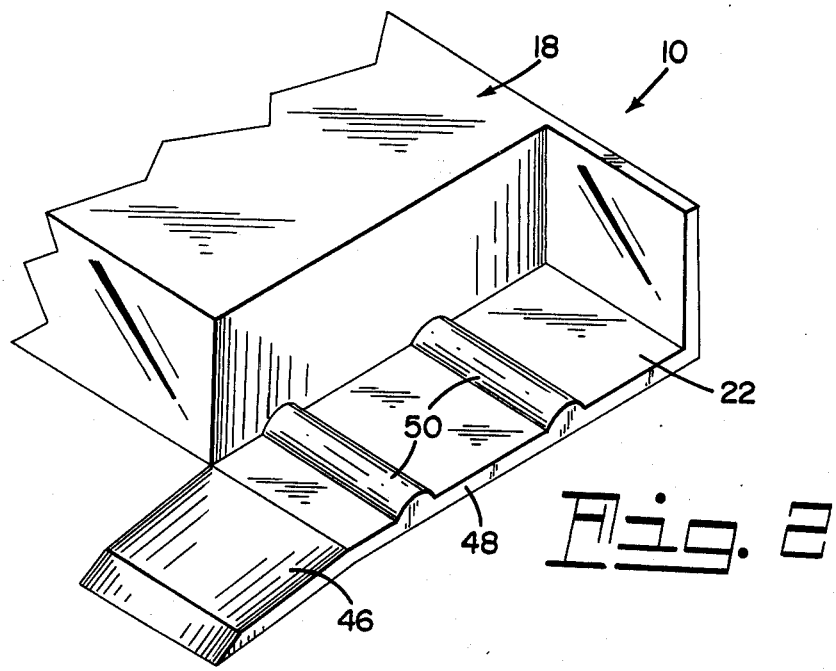
FIG. 2 is a perspective view of one end of the housing illustrating the terminal receptacle.

An alternate embodiment of the means for releasably restraining the terminal portions of the legs in the receptacles 20 and 22 is shown in FIG. 2. Herein, a fixed ramp 46 is provided which extends outwardly from the receptacles 20 and 22. The floor 48 of the receptacles 20 and 22 is provided with a pair of spaced-apart raised ribs 50 or similar structure for retaining the terminal portion of a leg of a bed therein; this is particularly applicable with wheeled beds. When the fixed ramp 46 is employed it is important that the ramp not extend completely to the floor. This is necessary to insure that the total weight of the bed is completely supported by the weight responsive elements 14.

Yet another alternate embodiment is shown in FIG. 4 where it will be seen that provision can be made for not only hinging the front walls 36 and 38 but the rear walls 52 and 54 as well. This provision allows the portable housings to be placed either in front of the bed or behind the bed and allows the bed to be pushed in either direction to position it within the appropriate receptacles. It provides an added flexibility that other known devices of this type do not have.

Yet another embodiment of the device is shown in FIG. 5 wherein it will be seen that the end sections 16 and 18 are mounted on rails 56 which are contained within center section 12. This provision allows a lengthwise adjustability of the housing to accommodate different width beds. Again, this embodiment greatly increases the flexibility and usefulness of this portable housing.

Figure 6:
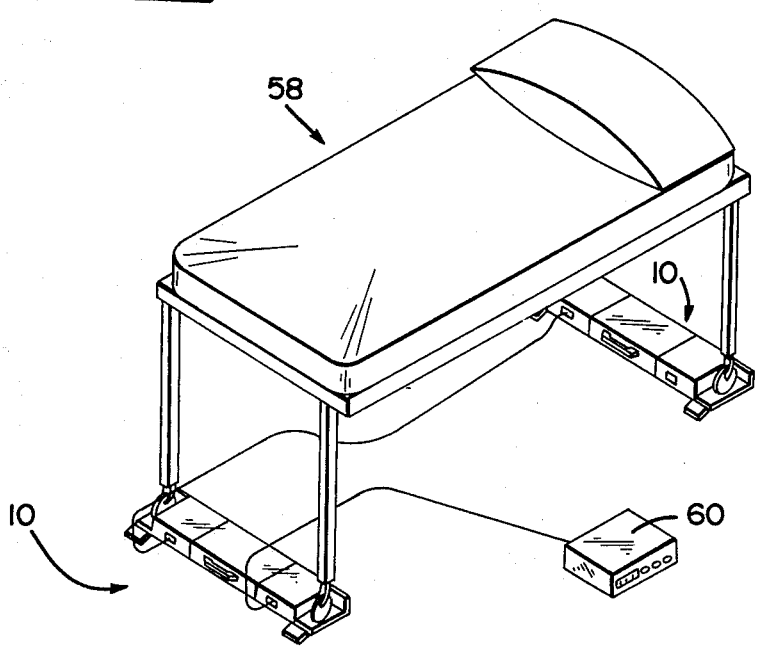
FIG. 6 is a perspective view of the apparatus of the invention being employed in use with a hospital bed.

The units are shown in operative position in FIG. 6 whereat a hospital bed 58 is mounted within the units. The ease of operation of the portable housing 10 of the invention is readily apparent from the illustration of FIG. 6. It can be seen therefrom that it is only necessary to position the housing behind the wheels of the bed and then to push the bed onto the proper receptacles. This ease of operation is not undermined by the weight of the bed as is the case with some prior art devices. Furthermore, the extreme portability of these devices allows their use with any standard bed and does not require a specialized location. The weight responsive elements in the units can be appropriately connected to any suitable readout device such as that shown at 60.

Figure 7:
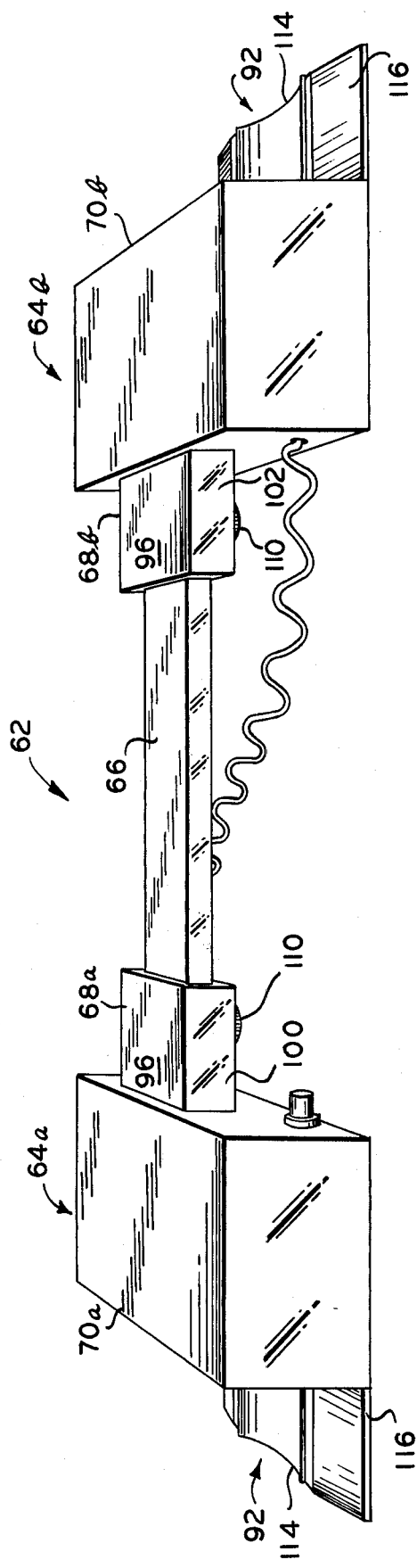
FIG. 7 is a perspective view of an alternate embodiment of the invention.
Figure 8:
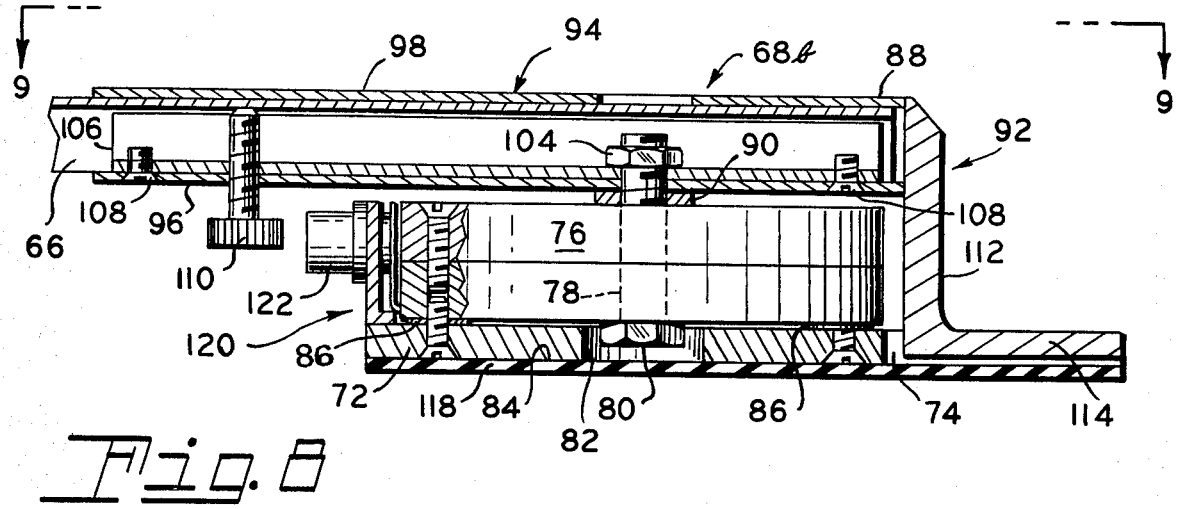
FIG. 8 is a sectional, elevational view of one of the units of the invention.
Figure 9:
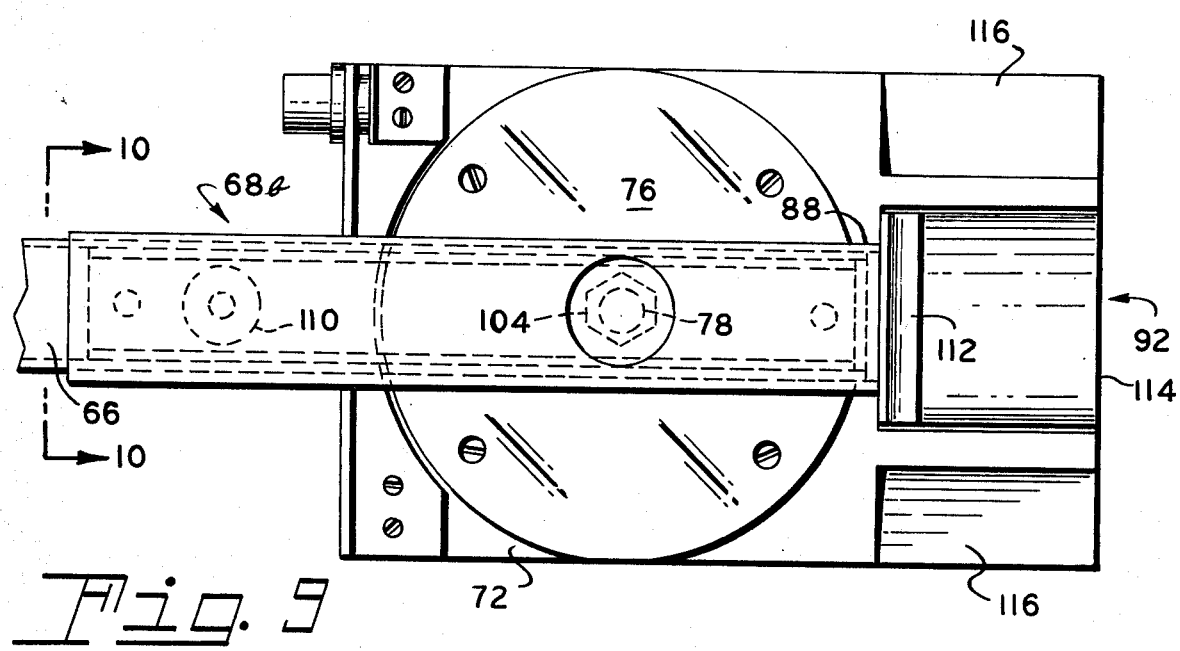
FIG. 9 is a plan view taken along the line 9—9 of FIG. 8.
Figure 10:
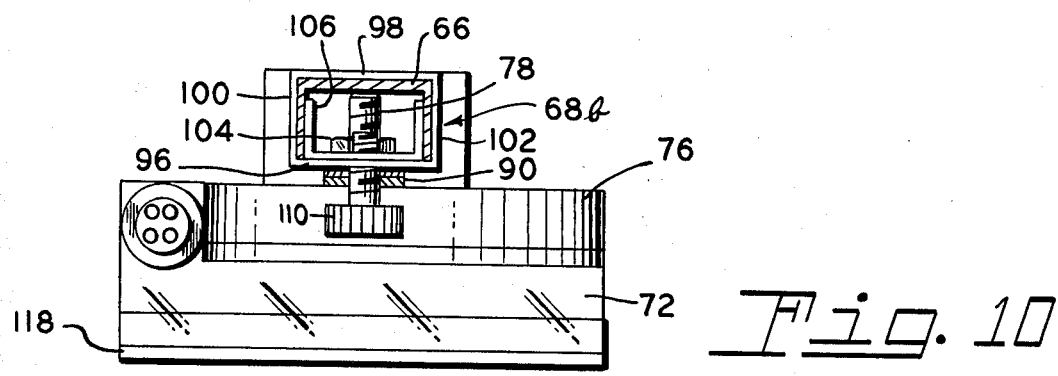
FIG. 10 is an end view taken along the line 10—10 of FIG. 9.
Figure 11:
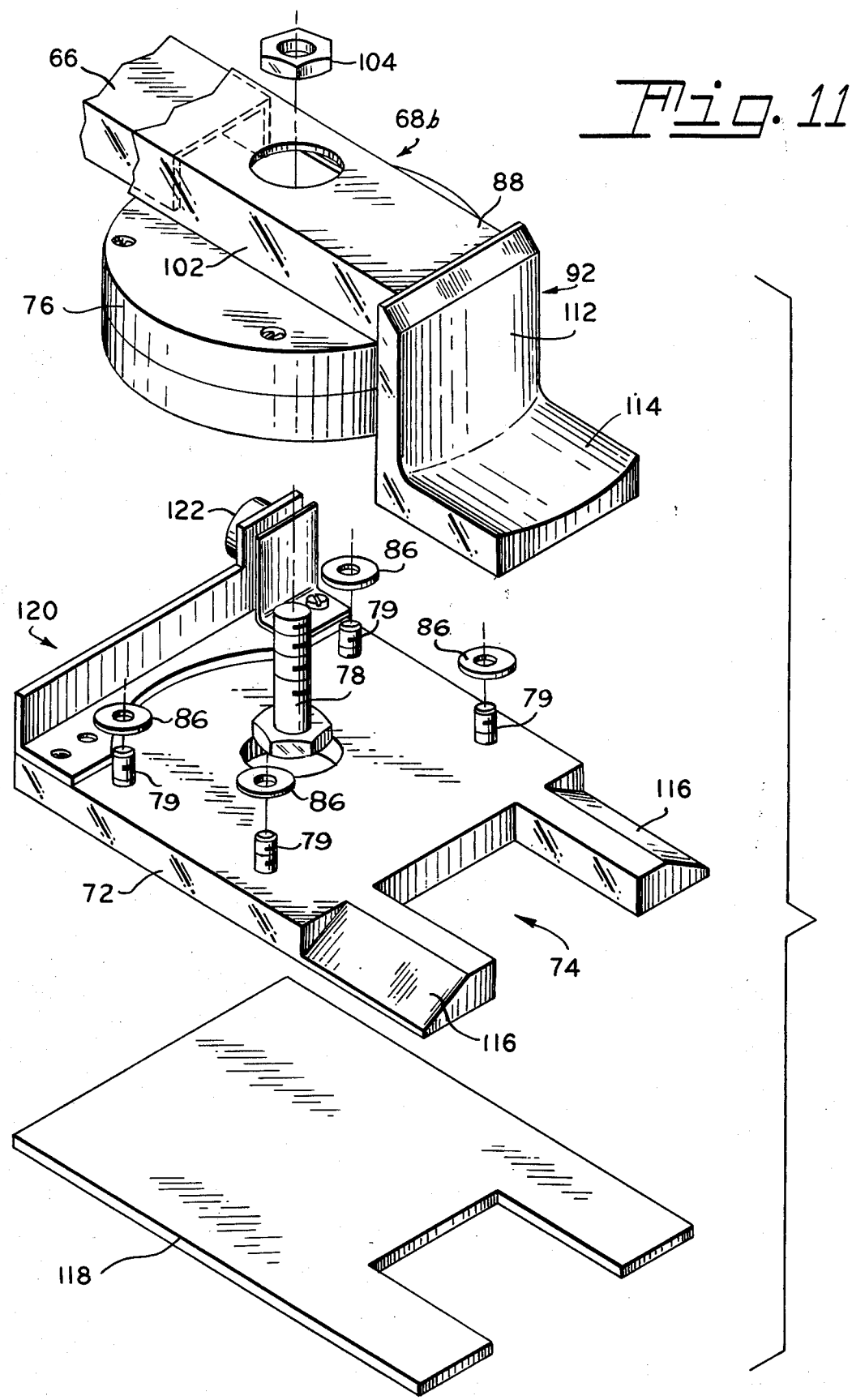
FIG. 11 is an exploded, perspective view of a unit, with some width hospital omitted.

An alternate embodiment of the invention is shown in FIG. 7–11. Referring specifically to FIG. 7, there is shown one unit 62 of a portable weighing system. As with the embodiment described above with particular reference to FIG. 6, two such units 62 are employed in the weighing system, one under the legs of the foot of the bed and one under the legs of the head of the bed. Unit 62 comprises two sub-units 64a and 64b, which are substantially identical.

The sub-units 64a and 64b, are adjustable toward and away from each other by means of a slide 66 which has its ends disposed within the weight transferring elements 68a and 68b respectively. The operative parts of each sub-unit are enclosed by covers 70a and 70b.

FIGS. 8–11 detail one such sub-unit with the cover removed. Each sub-unit, for example 64b, comprises a base member 72 of substantially quadrangular configuration with a cut-out portion 74 in an outside edge thereof (see particularly FIG. 11). Operatively connected to the base member 72 is a weight responsive element 76 similar to element 14 of the previously described embodiment. A suitable means of attachment is by upwardly projecting, threaded studs or bolts 79 threaded into the periphery of weight responsive element 76. Washers 86 of a suitable, resilient material, such as nylon, are interposed between the bottom surface of element 76 and the top surface of base member 72.

Weight transferring element 68b is affixed adjacent its end to weight responsive element 76 with bolt 78, whose head 80 mounts in opening 82 in base member 72, and spaced therefrom by means of one or more washers or nuts 90. The distal portion 88 of element 68b provides means 92 for receiving the terminal portion of the leg of a bed.

In this instance the weight transferring element 68b comprises an elongated, hollow, box-like housing 94 which has a bottom wall 96, a top wall 98 and side walls 100 and 102. The weight transferring element 68b is attached to bolt 78, which projects through bottom wall 96, by a nut 104. A slide guide and stiffening member 106, which comprises a "U" shaped channel, is affixed to bottom wall 96, as by screws 108. The sides of the "U" are spaced a given distance from the inside of side walls 100 and 102 to provide clearance for the side walls of slide 66. Slide 66 is shown as being an inverted "U" shaped channel. A suitable means, such as a thumb screw 110, is provided in a suitably threaded opening through bottom wall 98 and slide guide 106, for fixing the position of slide 66.

Means 92 is formed as an "L" shaped bracket having an upright section 112 welded or otherwise permanently fastened to distal portion 88. The extending leg 114 of the "L" shaped bracket is formed with a concave surface to receive the terminal portion of the leg of a bed.

When weight transferring element 68b is in position, leg 114 is arrayed within cut-out portion 74 of base member 72. A suitable spacing around leg 114 is provided to insure free movement thereof. From a perusal of FIGS. 7, 9, and 11 it will be seen that the outside edges 116 of cut-out portion 74 are beveled to provide easy access for the wheel of a hospital bed into the concave surface of leg 114.

To solidly fix the units 62 in position with respect to a bed, the base members 72 can have applied to the bottom surface 84 thereof a mat 118 of rubber or other suitable non-slip material.

A wall or flange 120 fixed to base member 72 carries a socket 122 for appropriate electrical connection.

The flange 120 also provides an appropriate area for the affixation of electrical normalizing components (not shown). The inclusion of such components can have the practical result of allowing parallel summation of the individual weight responsive elements at the bed location, thereby simplifying the cable connections and making the weight reading independent of center of gravity position. The output signals from the weight responsive elements in each housing pass through these normalizing components and are then paralleled so that the same signal is available from both of its connectors. Thus, only two cables are required; a short one between both housings and a long one from either housing to the readout. This greatly simplifies multi-bed installation.

The device described above has many advantages over prior devices. The wheel entrance area and ramp structure are a portion of the base and are in solid contact with the floor. This not only reduces the undesirable lateral torquing on the weight responsive element during loading, it also reduces the bed height increase to a bare minimum.

The end of the base member, in this latter embodiment, extends outside the point of application of force on the weight transferring element. This greatly increases stability for beds with a narrow wheel spacing and prevents tipping during loading should one wheel engage before the other. The sides of the base and ramp extend laterally outside the point of force application, reducing lateral tipping during loading. The ramps are symmetrical, allowing loading from both sides.

The receptacles for the wheels have a concave surface for restraint and do not require additional restraining mechanism. This also helps to achieve the low bed height increase.

While there has been shown and described what are at present considered to be the preferred embodiments of the invention, it will be apparent to those skilled in the art that various changes and modifications can be made herein without departing from the scope of the invention as defined by the appended claims.

What is claimed is:

1. A portable housing for a weighing system for monitoring the weight of a non-ambulatory patient, said housing comprising: an elongated, box-like apparatus having a central section and two end sections; each of said end sections containing at least one operatively positioned weight responsive element, and being further formed to provide a receptacle for the terminal portion of the leg of a bed and having associated therewith an entrance for said terminal portion and means for releasably restraining said terminal portion therein, said end sections being adjustable toward and away from one another whereby beds having legs of different widths can be accommodated.

2. The housing of claim 1 wherein said each of said entrances associated with each of said end sections comprises: a fixed ramp extending therefrom and said means for releasably restraining said terminal portion comprises a spaced apart pair of raised ribs extending parallel to the front and back of said central section.

3. A portable weighing system for monitoring the weight of a non-ambulatory patient, said system comprising: two pairs of units, each pair of units comprising two spaced apart weight responsive elements, each of said weight responsive elements being affixed to a base member; and an adjustable weight transferring element operatively connected adjacent each of its ends to one of said weight responsive elements, the distal portions of each of said ends being formed to receive the terminal portion of the leg of a bed.

4. The weighing system of claim 3 wherein said adjustable weight transferring element associated with each pair of units comprises two fixed housings one each attached to each of said weight responsive elements, each of said housings comprising a hollow substantially box-like member having a bottom wall, a top wall and side walls, a substantially "U" shaped channel fixed to said bottom wall, the sides of said "U" being spaced from said side walls; and an inverted "U" shaped slide fitting inside said box-like members.

5. The weighing system of claim 3 wherein said base member has a substantially quadrangular configuration with a cut-out portion in an outside edge thereof to receive said distal portion of said end of said adjustable weight transferring element.

6. The weighing system of claim 5 wherein said distal portion is substantially "L" shaped in cross-section.

* * * * *

UNITED STATES PATENT AND TRADEMARK OFFICE
CERTIFICATE OF CORRECTION

PATENT NO. : 3,961,675
DATED : June 8, 1976
INVENTOR(S) : Vernon Harold Siegel

It is certified that error appears in the above-identified patent and that said Letters Patent are hereby corrected as shown below:

Col. 2, line 24: "width hospital" should read --- parts ---

Signed and Sealed this

Fourteenth Day of September 1976

[SEAL]

Attest:

RUTH C. MASON
Attesting Officer

C. MARSHALL DANN
Commissioner of Patents and Trademarks